United States Patent [19]

Gelardi et al.

[11] 4,015,790
[45] Apr. 5, 1977

[54] TAPE CARTRIDGE

[75] Inventors: Anthony L. Gelardi, Cranston, R.I.;
Gregory Mathus, Cambridge, Mass.

[73] Assignee: The Morningstar Corporation of Cambridge, Cambridge, Mass.

[22] Filed: Aug. 5, 1975

[21] Appl. No.: 602,076

Related U.S. Application Data

[63] Continuation of Ser. No. 607,295, Jan. 4, 1967, abandoned.

[52] U.S. Cl. .................... 242/55.19 A; 206/1.5; 226/197; 242/197; 360/93
[51] Int. Cl.² .................... G11B 23/10
[58] Field of Search .......... 242/55.19 A, 55.19, 242/197, 198, 199, 200; 220/4 C, 4 E, 60; 206/52, 1.5; 226/196, 197; 360/93; 352/72, 78, 128

[56] References Cited

UNITED STATES PATENTS

| | | | |
|---|---|---|---|
| 2,778,637 | 1/1957 | Eash | 242/55.19 A |
| 2,908,769 | 10/1959 | Fonda | 242/55.19 A |
| 3,042,331 | 7/1962 | Bierman | 226/197 X |
| 3,065,310 | 11/1962 | Cross | 242/55.19 A |
| 3,077,281 | 2/1963 | Braverman | 220/4 |
| 3,241,781 | 3/1966 | Knox | 242/55.19 A |
| 3,252,670 | 5/1966 | Smith | 242/55.19 A |
| 3,285,526 | 11/1966 | Moore | 242/55.19 A |
| 3,343,759 | 9/1967 | Kallay | 242/55.19 A |
| 3,350,028 | 10/1967 | Lear | 242/55.19 A |
| 3,394,838 | 7/1968 | Larkin | 220/60 |
| 3,420,461 | 1/1969 | Cousino | 242/55.19 A |
| 3,438,591 | 4/1969 | Becker et al. | 242/55.19 A |
| 3,482,792 | 12/1969 | Auld | 242/55.19 A |
| 3,788,574 | 1/1974 | Wakeman et al. | 242/55.19 A |

*Primary Examiner*—Billy S. Taylor
*Attorney, Agent, or Firm*—Wolf, Greenfield & Sacks

[57] ABSTRACT

A cartridge for an endless magnetic tape with a reel having (1) a tape deck and an upwardly and inwardly tapered column with a wide cap to support the tape on the deck; (2) ribs and openings in the deck to crown the tape on the deck and allow particles to drop below the deck; (3) a tapered cam post to support the tape loop at one end across its width at the front of the cartridge; (4) a contoured pressure pad to support the tape loop at the front of the cartridge; (5) a guide to support the tape loop at an angle between the deck and cam post; and (6) supports for retaining the convolutions of tape on the deck and the loop when it becomes slack.

27 Claims, 14 Drawing Figures

INVENTORS
Anthony L. Gelardi
BY Gregory Mathur

ATTORNEYS

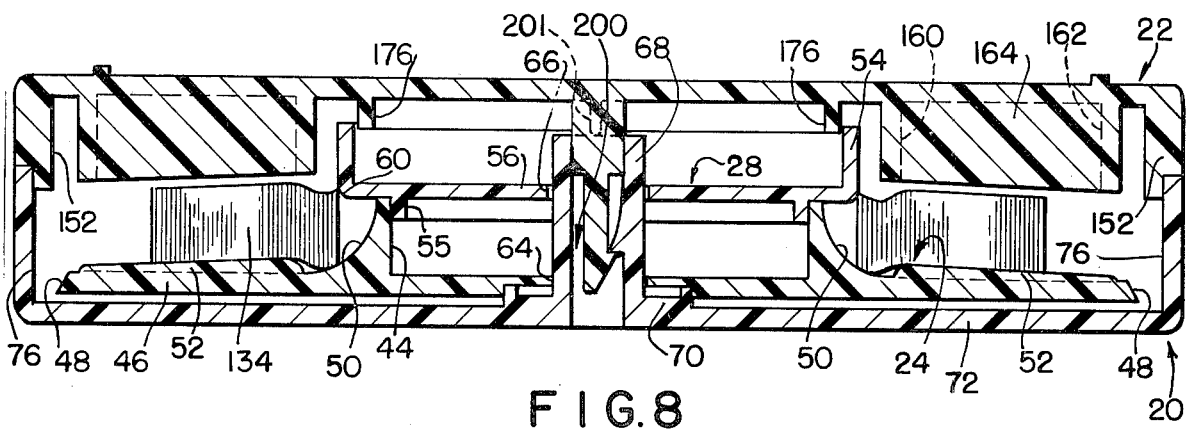
FIG.8
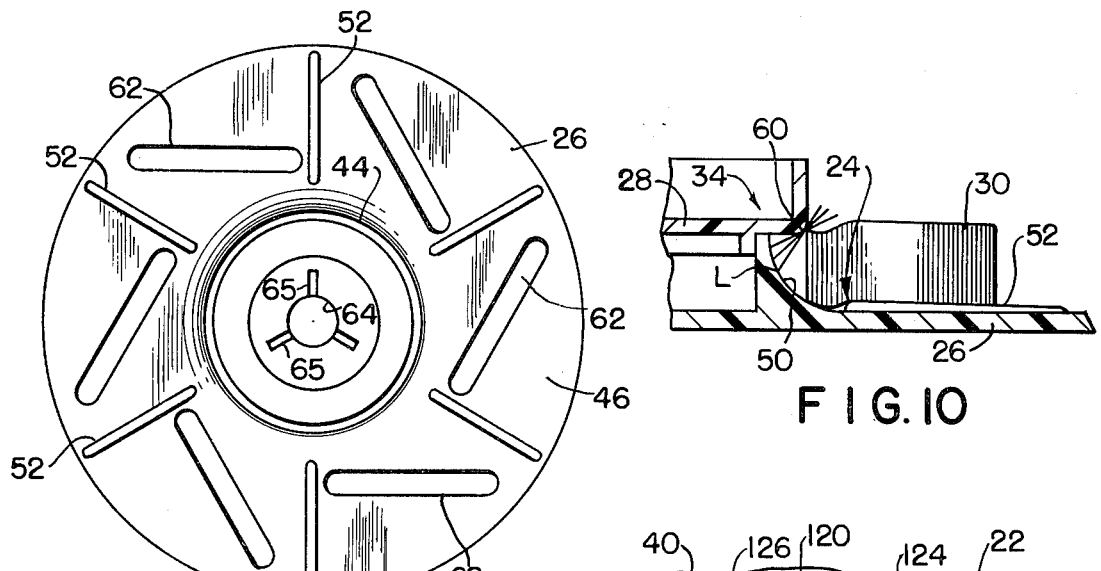
FIG.9
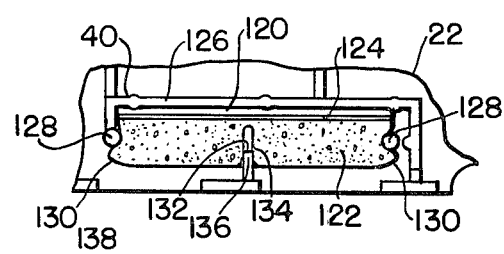
FIG.10
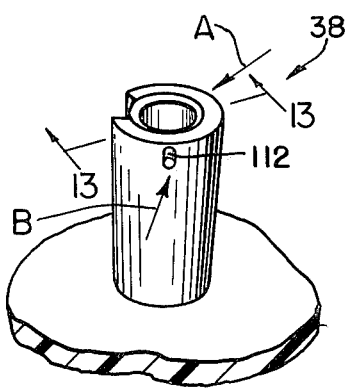
FIG.12
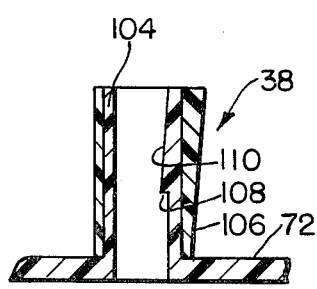
FIG.11
FIG.13
INVENTOR.
Anthony L. Gelardi
BY Gregory Mathur
ATTORNEYS

TAPE CARTRIDGE

This is a continuation, of application Ser. No. 607,295, filed Jan. 4, 1967, and now abandoned.

BACKGROUND OF THE INVENTION

This invention relates to tape cartridges and more particularly comprises a new and improved cartridge for endless magnetic audio tape.

SUMMARY OF THE INVENTION

An object of this invention is to provide an easily assembled magnetic tape cartridge which is relatively inexpensive to manufacture and which affords long and trouble free life.

FIG. 8 is a fragmentary cross-sectional view taken through the closed cartridge and illustrating the manner in which the reel and tape are disposed inside;

FIG. 9 is a plan view of the tape deck (of the reel);

FIG. 10 is a detail view showing the manner in which tape carried on the reel is drawn from the reel hub;

FIG. 11 is a bottom plan view of the pressure pad and showing the manner in which it is secured in the cover;

FIG. 12 is a fragmentary perspective view showing the cam post that guides the tape across the front of the cartridge; and FIG. 13 is a cross-sectional view of the cam post taken along the section line 13—13 in FIG. 12.

Figure 1:
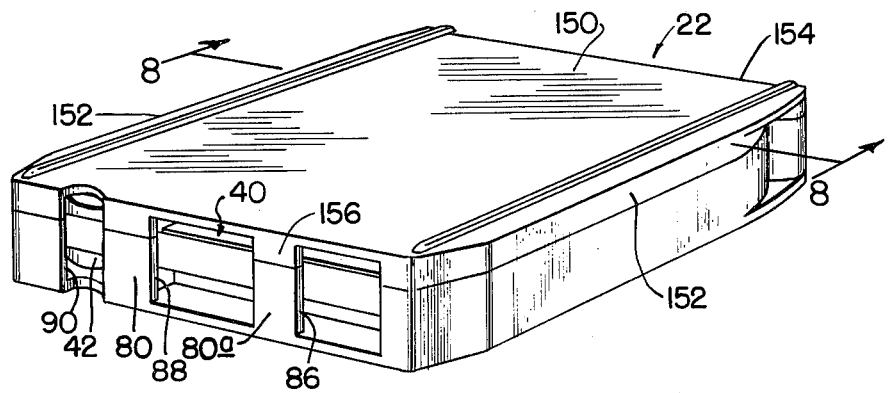
FIG. 1 is a perspective view of a magnetic tape cartridge constructed in accordance with this invention.
Figure 2:
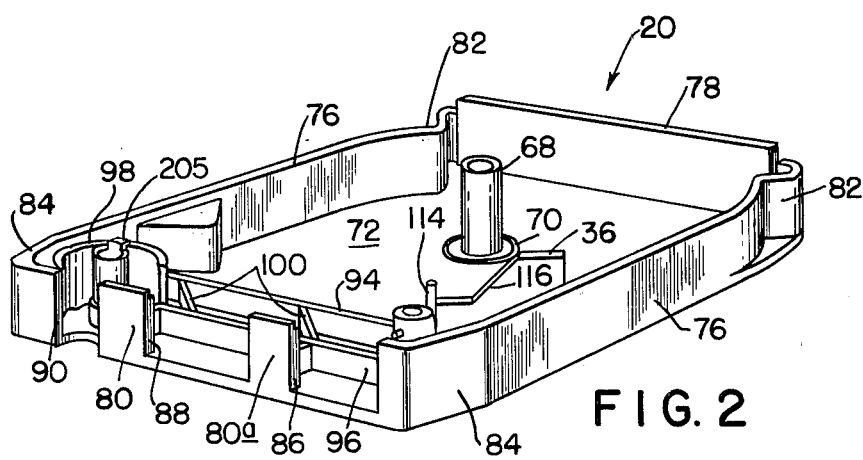
FIG. 2 is a perspective view of the base of the cartridge.

The magnetic tape cartridge shown in the drawing includes a base 20 and a cover 22 which together comprise the cartridge housing. Disposed within the cartridge is a tape reel 24 having a tape deck 26 and a cap 28. Wound about the reel 24 is an endless tape 30 which includes a loop 32 that extends from the center of the reel over the guide 36 to the cam post 38 and across the face of a pressure pad 40 to a roller 42 and back to the reel 24 as the outer turn of the wound tape on the deck 26. Many of these parts are described separately and in detail under appropriate subheadings in the following description.

TAPE REEL 24

The reel 24 shown in FIGS. 8–10 is basically composed of two parts; namely, the tape flange or deck 26 and the cap 28. The cap 28 along with the central upturned portion 44 of the deck 26 define the reel hub 34 which supports the tape in a coiled position on the tape deck 26 and further provides means for withdrawing the tape 32 from the reel in the manner generally suggested in FIG. 3.

The deck 26 is composed of a flat circular plate 46 having a bevelled cuter edge 48, and the upturned central portion 44 emerges smoothly from the circular plate 46 at a radius 50. The upper surface of the circular plate 46 carries a number of radially extending ribs 52 (six shown in FIG. 9) that are inclined upwardly and inwardly from the peripheral edge 48 of the plate toward the radius 50. The upturned central portion 44 of the tape deck 26 defines an annular wall which supports the cap 28.

The cap 28 is in the form of a shallow dish having a cylindrical peripheral wall 54 and a flat bottom circular wall 56, and inwardly of the periphery of the wall 56 a downturned flange 58 is provided that sits within the annular wall 44 of the turntable 26 to position and center the cap 28 with respect to the turntable 26. The diameter of the cylindrical wall 54 of the cap is substantially equal to the largest diameter of the radius. The lower corner 60 of the reel cap 28 is provided with a radius also, for reasons which will become clear below in connection with the description of the operation of the reel. It will also be noted in FIG. 9 that the tape deck 26 is provided with a number of slots 62 which permit any particles such as graphite which are deposited on the deck to drop through the plate 46 to the bottom of the case so that they will not mar the tape or otherwise interfere with the proper operation of the cartridge.

An opening 64 is provided at the center of the circular plate 46, and a similar opening 66 is provided in the flat wall 56 of the cap 28, and the aligned openings are designed to receive a sleeve 68 that serves as a spindle for the reel 24. It will be noted in FIG. 8 that the spindle 68 extends upwardly from a circular collar 70 formed in the bottom wall 72 of the cartridge base 20, and the collar 70 supports the bottom of the circular wall 46 for rotation in the case.

The cap 28 and the deck 26 are secured permanently to one other so that the two rotate together when the tape is drawn from the reel in the manner to be described below. The cap and deck may be secured together by ultrasonic welding, adhesive, or some mechanical connection, or by any means which does not adversely affect the tape mounted on the reel.

Three radial slots 65 may be provided in the bottom plate 46 radiating outwardly from the opening 64 at its center. The slots 65 are shown in FIG. 9 and receive the springs of a spindle upon which the reel 24 may be mounted when tape is initially wound on it. The slots 65 play no part of the invention when the reel is in the case. Rather, the reel 24 is freely rotatable on the sleeve 68 and is rotated by the action of drawing off tape from the hub portion.

In FIG. 10 the manner in which the tape is drawn from the hub is shown. As is standard with cartridges of the type to which this invention relates, the tape is drawn from the reel 24 by peeling the inner convolution of the tape from the hub. The tape is returned to the reel by winding it as the outer convolution on the reel. As is evident in the drawing, the innermost convolution of the tape stands substantially vertical at the hub with the upper portion of the turn being supported against the cylindrical surface 54 of the cap 28 and the lower edge of the convolution being supported at the outer diameter of the radius 50. When the inner turn is lifted upwardly and removed from the reel, the radius 50 allows sufficient room for the lower edge L of the tape convolution to pivot inwardly about the radius 60 of the cap without buckling the tape or otherwise adversely affecting it. Thus, the tape is allowed to swing inwardly about the radius 60 because of the clearance between its lower edge and the radius 50. As a result, the tape convolution may be pivoted and drawn upwardly past the edge 60 and escape from the next inner convolution of tape on the reel. The radius 60 does not allow the cap 28 to crease the tape.

THE BASE 20

The base includes a generally flat bottom wall 72, a pair of side walls 76, a rear wall 78, and a front wall 80. The side walls 76 are niched as shown at 82 adjacent the rear wall 78 so as to provide a finger grip to enable the cartridge to be inserted and removed from the slot provided in the recorder and/or playback machine (not shown) for which the cartridge is designed. Conventionally, those machines have an opening in their front of a size to receive the cartridge in a horizontal orientation with the front wall 80 of the cartridge inserted first into the opening. The rear wall 78 of the cartridge extends out of the slot to enable the fingers to engage the notches 82 so as to enable the user to manipulate the cartridge in and out of the machine. The forward ends 84 of the side walls converge slightly toward one another so as to facilitate insertion of the cartridge in the opening of the recording and/or playback machine.

The sleeve 68 is mounted on and may be formed as an integral part of the bottom wall 72 of the base and extends upwardly from the raised collar portion 70. The sleeve 68 serves as a spindle for the reel 24, and the collar 70 supports the turntable 26 of the reel above the plane of the bottom wall 72 to reduce friction and enable the reel to turn more freely on the spindle.

The front wall 80 of the base 20 is provided with three openings 86, 88 and 90 so as to expose a portion of the loop of the tape that travels across the front of the cartridge. The openings 86 and 88 are provided to allow recording and playback heads (not shown) forming part of the machine to engage the tape as it moves across the front of the cartridge. It is to be understood that the section 80a of the front wall 80 between the openings 86 and 88 may be removed but is provided in the present embodiment so as to add strength to the cartridge. The opening 90 disposed adjacent the roller 92 allows the capstan or drive roller forming part of the recording and/or playback machine to pinch the tape loop between it and the roller 42 so as to draw the loop of tape across the front of the cartridge behind the wall 80 and against the recording and/or playback heads of the machine. The capstan in cooperation with the roller 42 provides the sole means for moving the tape by drawing the tape from the inner convolution on the reel 24, which in turn causes the reel to rotate, and the tape which passes the roller and capstan in turn is wound onto the reel as it rotates to form the outermost convolution of the tape.

As shown in FIGS. 2—4 and 4A a pair of parallel transverse ribs 94 and 96 extend across the cartridge at the front portion thereof. The rear rib 94 extends between the side walls 76 while the front rib 96 extends from the cam post 38 on its right end to the shoe and shield 98 at its left end. The ribs 94 and 96 are approximately one-eighth inch and three-sixteenth inch in height respectively. A plurality of angularly disposed ribs 100 which are the same height as the rib 94 extend between the transverse ribs 94 and 96. The function performed by those ribs is made evident in FIG. 4A. In that figure, the exposed loop of tape from the reel 24 is shown to assume a somewhat abnormal attitude wherein considerable slack is present between the outer and inner convolutions. Because no brake or other device is provided for the reel 24, agitation of the cartridge caused by shaking through shipment or improper handling or dropping etc., may cause the reel to rotate in a counterclockwise direction as viewed in that figure so as to effectively enlarge the size of the loop extending from the wound tape on the reel. This causes the tape to back off the outer convolution of the wound tape on the reel and form a series of subloops that tend to gather at the forward portion of the cartridge. It will be noted in FIG. 4A that the orientation of the ribs 100 is such that they are aligned with the direction of movement of the loops as their size increases, and thus the ribs 100 along with the transverse ribs 94 and 96 support the subloops and prevent them from twisting or otherwise becoming disoriented with respect to the reel 24. The height of the ribs 100 is approximately equal to the upper surface of the turntable 26 and therefore when the cartridge is placed in operation in the machine, and tape is drawn from the reel in the conventional manner, the subloops which have accumulated at the front of the cartridge, will be wound upon the reel.

CAM POST 38

In FIGS. 12 and 13 the cam post 38 is shown in detail. The post includes a central sleeve 104 and an outer sleeve 106 which may be formed as either an integral part of the sleeve 104 or as a separate part which is mounted in place on the sleeve 104. The sleeve 104 is provided in its interior with a step 108 facing downwardly adjacent its lower end, and an inclined plane 110 leads from the top of the sleeve downwardly to the step. As will be described in greater detail in connection with FIGS. 6 and 7, the step 108 cooperates with a post carried by the cover to releasably secure the cover 22 and base 20 together.

The outer sleeve 106 through approximately 90° of its circumference is downwardly tapered so as to orient the tape loop as it is drawn horizontally from the inner convolution on the reel and turn it to a vertical position adjacent the front wall 80 in the desired position with respect to the playback and/or recording heads which extend through the openings 86 and 88. The taper of the sleeve 106 gradually reduces from the location of arrow A shown in FIG. 12 to the location of arrow B in the same figure so that at arrow B the outer surface of the sleeve 106 is substantially perpendicular to the bottom wall 72 of the base. A pin 112 extends outwardly from adjacent the top of the sleeve 106 and serves to retain the tape loop about the cam post 38 and prevent it from riding upwardly in the cartridge. The sleeve 106 may be made of Delren or some similar self-lubricating material so as to reduce friction and wear on the tape as it is drawn across the cam post.

GUIDE 36

The guide 36 is disposed beyond the periphery of the turntable 26 of the reel and is disposed between the reel and the cam post 38. The guide 36 has a post 114 at its inner end, which is oriented vertically in the cartridge. An inclined guiding surface 116 is formed in the upper surface of the guide 36 and serves to support the portion of the loop extending between the reel and the cam post. As is evident in FIG. 3, as the tape is drawn upwardly from the center of the reel from the innermost convolution and extends over the other convolutions of the tape supported on the turntable 26, the tape is substantially in a horizontal plane, and the tape must turn through 90° so that it lies in a vertical plane behind the front wall 80. The cam post 38 helps to turn the tape to the vertical plane, and the inclined surface or edge 116 of the guide 36 supports the tape at approximately a 45° angle from the horizontal. The post 114 prevents the portion of the loop extending from the reel to the cam post 38 from moving transversely in the cartridge toward the opposite portion of the loop. The inclined edge 116 also prevents the portion of the tape above the convolutions on the reel from assuming a horizontal position and thereby sliding under the rib 170 in the cover, which is described in greater detail below.

PRESSURE PAD 40

The pressure pad 40 shown in detail in FIG. 11 is disposed just inwardly of the window openings 86 and 88 in the front wall 80 of the base 20 and urges the portion of the loop of the tape that travels across the front of the cartridge against the playback and/or recording heads of the machine. The pressure pad, however, does not force or tend to force a loop outwardly through the windows 86 and 88 but rather provides a support for that portion of the loop so that the heads of the machine may bear against the tape so as to make contact with it under sufficient pressure to pick up the signal stored on the tape or impress a signal on it. The pressure pad is actually carried by the cover and includes a stiff rear panel 120 that sports a foam rubber or foam plastic cushion 122 secured to it by a coating of adhesive 124. A wall 126 provided in the cover 22 and in the plane of the rib 96 in the base when the case and cover are assembled, serves to orient the pressure pad 40 with the stiff backer 120 of the pad lying against the wall 126. A pair of pins 128 carried by the cover are disposed so as to engage the ends of the cushion 122 when the pad is mounted in place. The pins 128 pinch the ends of the cushion and tend to draw the corners 130 of the cushion into a round configuration as shown in FIG. 11. In this particular arrangement, the cushion is rectangular, and the pins 128 are spaced closer together than the cushion width. Consequently, when the cushion is mounted in the position shown in FIG. 11, the ends of the cushion are compressed which action draws the corners 130 inwardly as the cushion wraps about the pins. A rib 132 also carried by the cover 22 and spaced from the wall 126 engages the cushion 122 intermediate its ends so as to firmly hold the cushion in place. A slot 134 may be provided in the cushion to receive the rib 132 so as to retain it in the proper position. The slot 34 should be so sized as to position the edge 136 of the rib 132 inwardly of the cushion surface 138 so that the tape drawn across the cushion between it and the recording and/or playback heads will not be marred by it.

SHOE AND SHIELD 98

Figure 3:
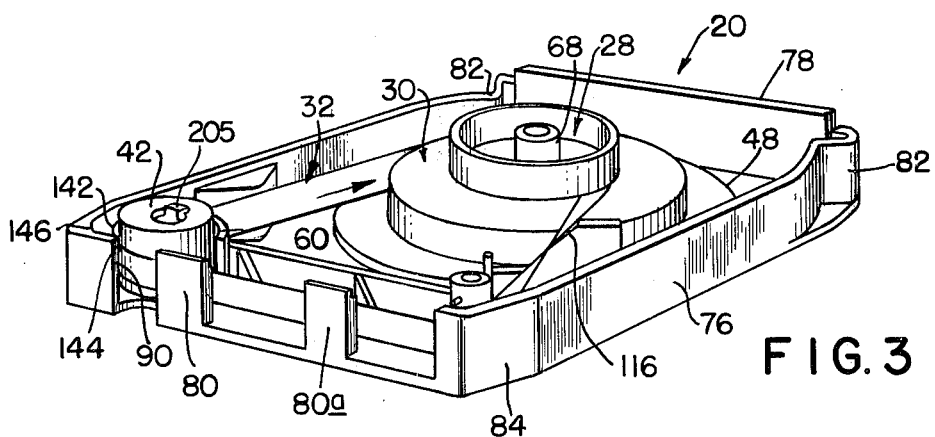
FIG. 3 is a perspective view similar to FIG. 2 with the tape deck and tape added.
Figure 4:
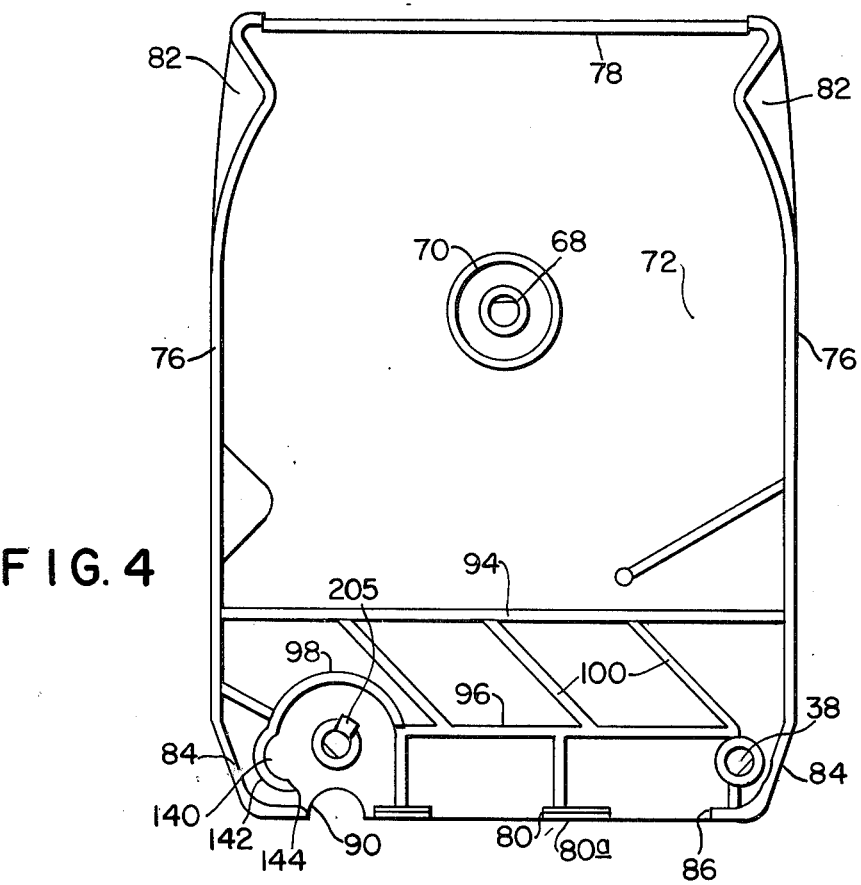
FIG. 4 is a plan view of the base of the cartridge.
Figure 4A:
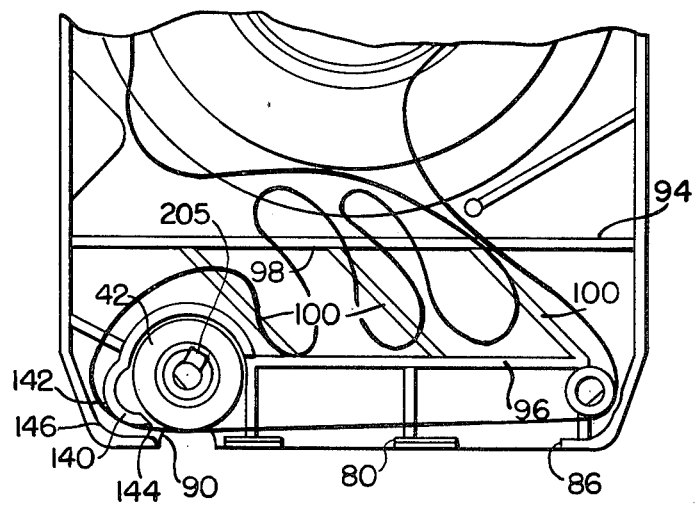
FIG. 4A is a fragmentary plan view of the base and showing how the loose tape is supported on the base rib arrangement.

As shown in FIGS. 3, 4 and 4A, the shoe and shield 98 extends about approximately 220° of the roller 42, and the forward end 140 of the shoe and shield lies very closely adjacent the roller periphery. The end 140 which itself is rounded about the outer surface as shown at 142 to support the tape loop 32 has a rather sharp corner 144 as a leading edge to wipe the tape off the roller 42 as it leaves the space between the roller 42 and the capstan (not shown). The remaining portion of the shield 90 prevents the loop of tape, particularly when it becomes loose, from reengaging the roller and being drawn underneath the main loop and being caught between the roller and capstan as the roller turns. It will be appreciated that if that happens the tape likely would become torn or otherwise mutilated.

It will also be noted in connection with FIGS. 4 and 4A that the inner corner 146 of the cartridge where the side wall 76 joins the front wall 80 at the left side adjacent the roller 42 is rounded. The rounding of that corner provides a smooth curve so as to prevent the loop from catching in the corner and backing up and out the window 90 when the cartridge is being handled. It will also be appreciated than when the cartridge is not in operation and the reel 24 is free to rotate, the loop 32 may become slack, and shaking may tend to advance the tape, but the absence of a capstan at the window 90 may allow the tape to back out that window particularly if the slack loop bunched up at the corner 146. The rounded configuration at the inner edge prevents this from happening.

COVER 22

Figure 5:
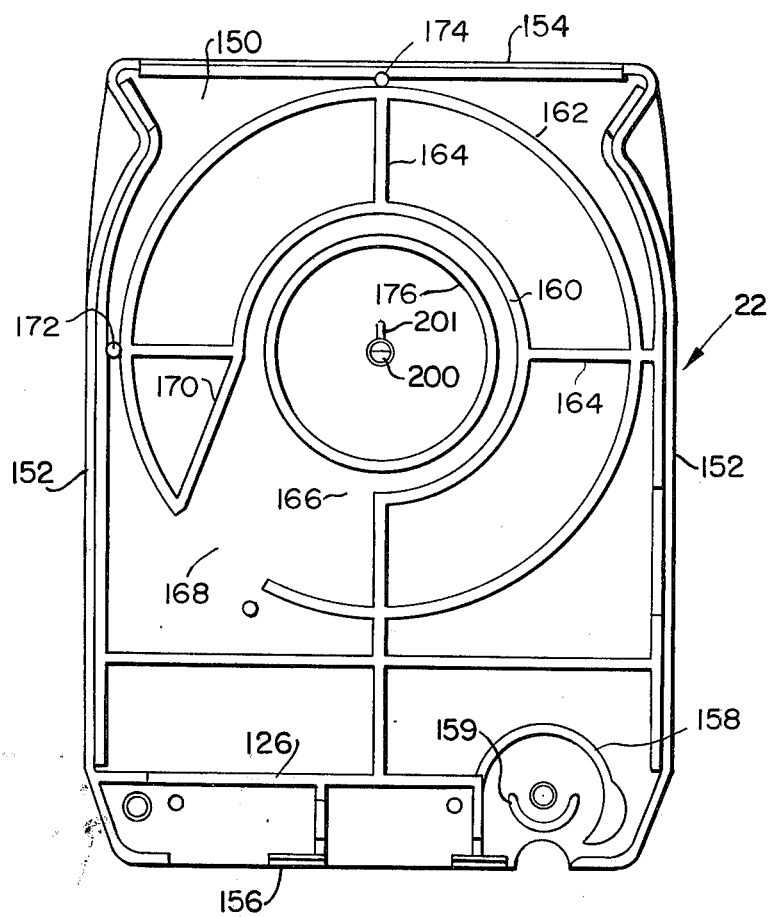
FIG. 5 is a plan view of the cover of the cartridge shown in the inverted position.

The cover 22 shown in the inverted position in FIG. 5 includes a top wall 150, side walls 152, rear wall 154 and front wall 156. The side walls 152, rear wall 154 and front wall 156 are generally of the same contour as the corresponding walls in the base so that when the case is assembled the walls form a smooth outer surface for the cartridge as shown in FIG. 1. The cover also includes a short circular wall 158 which is contoured to correspond to the shoe and shield 98 and form an extension of it. The wall 126 which provides a support for the pressure pad 40 is shown in FIG. 5 to be oriented parallel to the front wall 156. A semi-circular wall 159 lies within the wall 158 and bears against the top of the pressure roller 42 when the cartridge is closed to prevent the roller from riding up and down on the sleeve 180 within and cause distortion of the signal on the tape when it is played back on the machine.

A pair of generally circular walls 160 and 162 are disposed in the rear portion of the cover and which overlie the reel when the case is assembled. The circular walls 160 and 162 are interconnected by a plurality of radial ribs 164. The ribs 164 with the circular walls serve to retain the coiled tape on the turntable 26 and prevent each of the convolutions from telescoping as much as the tape width, unraveling, and failing off the platform when the cartridge is inverted. The particular configuration of the circular walls and radial ribs is not important so long as they are spaced close enough to the upper edges of the convolutions of tape on the turntable to prevent them from telescoping significantly. It will be noted in FIG. 5 that the circular walls 160 and 162 are not continuous but rather are broken at 166 and 168 to allow the innermost convolution on the turntable from being drawn upwardly over the other convolutions. Another retainer rib 170 is shown to join the inner and outer circular walls 160 and 162 to the left of the openings 166 and 168 as viewed in FIG. 5. That rib prevents the inner turn of tape from backing up and dropping over the outside turn when the cartridge is agitated and the tape is made slack. Effectively the retainer rib 170 prevents backup of the tape from the cam post. The guide surface 116 cooperates with the rib 170 by preventing the tape from sliding under the rib 170.

The ribs 164 which join the inner and outer circular walls as well as the rib 170 are shorter at the inner circular wall 160 than at the outer wall 162, and the contour of the ribs follows that of the ribs 52 formed on the turntable. This is shown in FIG. 8. The ribs 52 cause the tape carried on the reel to crown or form a high point between the inner and outer convolutions but nearer to the inner convolution. This crown itself may serve as a guide to carry the tape from the innermost convolution to the guide 36. The tape passing over the crown is in a generally horizontal position, and as it moves outwardly from the crown to the guide 36 it moves to an angular position and therefore requires greater room measured in a vertical direction. The contour of the tape wound on the turntable provides this additional clearance.

A pair of pins 172 and 174 extend upwardly from the cover when it is in its inverted position, and the pins overlie the periphery of the turntable and are closely spaced with respect to it when the cover and base are assembled. The pins prevent the outer convolutions of tape from dropping off the periphery of the turntable when the tape in the cartridge is slack due to agitation or some other cause. It will be appreciated that a lip could be placed on the periphery of the turntable with or without the pins 172 and 174 to assist in this function. It is of course, important that the tape not fall off the platform edge and get entangled beneath it to afford proper operation.

A very shallow circular rib 176 is disposed within the circular wall 160. The rib 176 prevents the tape loop from passing over the reel from one side to the other, which would obviously foul the tape.

In FIGS. 5 and 8 a pin 200 is shown secured to the cover at the center of the walls 160 and 162. The pin, as described below, cooperates with the spindle-sleeve 68 to secure the cover and base of the cartridge together. Moreover, a fin 201 extends radially from the pin 200 and bears against the top of the sleeve 68. The pin imparts stiffness to the cartridge at the center by supporting the center of the cover and prevents the cover and base from being squeezed together.

LATCHING DEVICES

Figure 6:
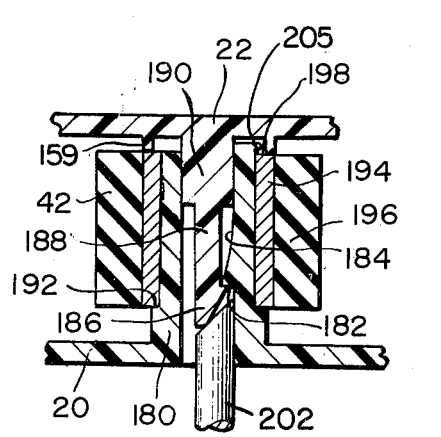
FIGS. 6 and 7 are enlarged fragmentary cross-sectional views showing the manner in which the base and cover of the cartridge are secured together within the pressure roller.
Figure 7:
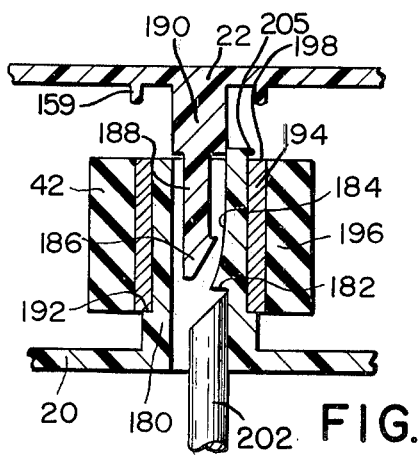

In FIGS. 6 and 7 a section is shown taken through one of three latching devices that serve to hold the case in the assembled condition. In those figures, a sleeve 180 is shown which supports the pressure roller 42. The sleeve 180 includes a shoulder 182 on its inner surface, and an inclined plane 184 is formed as a wedge to meet the outer edge of the shoulder and upon which the hookshaped member 186 of pin 188 may ride to assume the position shown in FIG. 6. The hook shaped member 186 is formed on the lower end of pin 188 carried by the cover 22, and it is apparent that the cover 22 and base 20 are securely held together when the hook 186 engages the shoulder 182 in the manner shown in FIG. 6. It will be noted in FIG. 13 that a similar shoulder and wedge are provided in the sleeve 104 in the cam post 38. A similar hook meets with that sleeve. In FIGS. 6 and 7 it will be noted that the lower portion 190 of the pin 188 is enlarged and has a diameter substantially equal to the inner diameter of the sleeve 180 above the wedge 184 so that the lower portion 190 serves precisely to position the cover with respect to the base.

A shoulder 192 is provided in the lower portion of the sleeve 180, which shoulder supports the roller 42. In FIG. 6 it will be noted that the roller includes a plastic sleeve 194 that sits on the shoulder 192 and a rubber gasket 196 that cooperates with the capstan of the machine to pinch the tape and transport it across the front of the cartridge. The arcuate wall 158 formed in the cover 22 engages the upper edge of the sleeve 194. Sufficient clearance is provided between the shoulder 192 and the wall 158 at each end of the roller so as to allow the roller to turn freely on the outer surface of the sleeve 180. However, the clearance is not such as to allow wobbling of the roller. The shoulder and wall prevent the roller from riding upwardly and downwardly as it rotates on the sleeve and therefore eliminates any playback distortion when the tape is played on the machine.

It will be noted in FIG. 8 that the third pin 200 and sleeve 68 secure the cover and base together. Thus, three connections are employed to releasably lock the cartridge in a closed position. The location of the three pin and sleeve connections, two at the front of the cartridge and one at the center, along with a label that may be wrapped over the top and bottom walls and across the back wall of the cartridge very firmly hold the cartridge in the assembled relationship.

The endless tape cartridge of this invention operates in a manner generally similar to the endless tape cartridges now in use. The tape is drawn from the center of the reel and is returned to the outer convolution, and the loop formed is directed across the front of the cartridge where it may be engaged between the capstan of the machine and the roller 42 provided in the cartridge to provide the driving force. The reel itself is not driven directly but rather is rotated by the tape as it is drawn from the innermost convolution. This rotation in turn enables the reel to take up the loop as it leaves the roller 42.

While the cartridge operates in a manner generally similar to other cartridges now available, it has many advantages over them. One such advantage is the very convenient way in which the case is locked by the pins and sleeves as shown in FIGS. 6–8 and 13. It is evident that the cover is merely dropped onto the base with the three locking pins inserted in the sleeves. A slight downwardly applied force on the cover causes the hook portions of the stems to engage the shoulders and to hold the case firmly in the assembled form. To open the case, a simple jig may be provided as suggested at 202 in FIGS. 6 and 7 which engages the lowermost portion of the pins and moves them off the shoulders at the sleeves. It is evident in FIGS. 6 and 7 that when the hookshaped end of the stem is moved to the left by the jig 202, it will release the shoulder 182 and thereafter the pin and the cover may be withdrawn.

Another advantage of the present invention is the safeguards provided to prevent the endless tape from being entwined about the pressure roller or above or beneath the reel or in the front of the cartridge behind the pressure pad. The guides provided hold the tape in the intended path and even if some slack should develop it is prevented from entangling in the mechanism so as to interfere with the proper operation of the cartridge. Whatever slack does occur will be taken up when the cartridge is activated by a capstan engaging the tape against the pressure roller 42.

As still another advantages of the present invention, the cartridge includes means for distributing the tension on the tape evenly across its width at the various points where contact is made with the tape at the exposed loop. For example, the cam post is pitched in such a way as to compensate for the turn in the tape and the change in planar attitude between the guide 36 and the front run of the loop pressure pad. This even distribution of the tension increased the lift of the tape.

As yet another advantage of the present invention, the number of parts which comprise the cartridge have been greatly reduced. In addition to the base and cover, the cartridge is made up of the reel, roller, cam post and pressure pad. Thus, four parts in addition to the cover and case comprise the entire package.

The case in its assembled form has a smooth and continuous upper and lower surface and wall, so that a single label may be applied to the cartridge which extends about the top and bottom and over the rear wall. There are no breaks, ledges, undercuts or similar forms which can create a problem.

Another important advantage of this invention is the ability of the cartridge manufacturer to pre-assemble the several parts in the base and cover of the cartridge and ship the base and cover to the customer who then introduces the tape, and then closes the cartridge and applies the label. As described above, the sleeve 106 is split as shown in FIG. 12 and it is held in place on the inner sleeve 104 by its own spring tension. Obviously a groove and tongue can be provided in the sleeves to orient the outer sleeve in position. The pressure pad 40 is held in place between the pins 128, wall 126 and rib 132. The roller 42 is held in place by a lip 205 on the top of sleeve 180. The lip 205 releasably holds the roller without the aid of the arcuate wall 159. Therefore, the customer need only wind the tape on the reel 24 and place the reel on the spindle-sleeve 68 with the loop in place about the cam post and roller and thereafter close the case and attach the label.

Although only one embodiment of this invention has been described in detail, it will be apparent that numerous modifications may be made of the invention without departing from its spirit. Therefore it is not intended to limit the scope of this invention to the single embodiment illustrated and described. Rather, it is intended that the score of this invention be determined by the appended claims and their equivalents.

What is claimed is:

1. A magnetic tape cartridge for endless tape comprising
   a cover and a base,
   and a reel mounted for rotation on the base for carrying the endless tape in a wound condition with an exposed loop, said reel having a reel flange and a central column with the column diminishing in diameter away from the flange,
   and a cap secured to the reel on top of the column and having an outer cylindrical wall substantially greater in diameter than the top of the column and with the bottom of the cylindrical wall being spaced from the flange less than the width of the tape to be packaged in the cartridge.

2. A magnetic tape cartridge as described in claim 1 further characterized by,
   said flange having a plurality of radially extending ribs having their inner edge spaced from the column and diminishing in height from the inner to the outer ends to form a crown in the tape convolutions supported on edge on the ribs.

3. A magnetic tape cartridge as described in claim 1 further characterized by said flange having a plurality of openings extending therethrough for allowing particles to drop through to the base of the case.

4. A magnetic tape cartridge as described in claim 2 further characterized by said flange, having a plurality of openings disposed between the ribs and extending through the flange for allowing particles to drop through to the base of the case.

5. A magnetic tape cartridge as described in claim 1 further characterized by a sleeve member extending upwardly from the bottom of the base and the center of the reel and serving as a spindle for the reel,
   a pin member extending downwardly from the cover and extending into the sleeve member,
   and a shoulder formed on one of the members and a hook on the other cooperating to lock the base and cover together.

6. A magnetic tape cartridge as described in claim 5 further characterized by additional sleeve members and pin members with shoulders and hooks and cooperating with the first-named sleeve and pin members for locking the cover and base together.

7. A magnetic tape cartridge as described in claim 2 further characterized by a sleeve member extending upwardly from the bottom of the base and the center of the reel and serving as a spindle for the reel,
   a pin member extending downwardly from the cover and extending into the sleeve member,
   and a shoulder formed on one of the members and a hook on the other cooperating to lock the base and cover together.

8. A magnetic tape cartridge as described in claim 1 further characterized by a radius formed at the lower edge of the cylindrical wall of the cap over which tape is drawn when the inner convolution of tape is stripped from the reel.

9. A magnetic tape cartridge as described in claim 8 further characterized by a radius formed at the bottom of the column smoothly merging the flange and column for preventing the inner convolution of tape from sliding under the cap.

10. A magnetic tape cartridge as described in claim 1 further characterized by a plurality of ribs formed in the cover and overlying the reel for preventing the tape on the flange from telescoping off the flange.

11. A magnetic tape cartridge as described in claim 1 further characterized by means cooperating with the periphery of the flange for preventing the outer convolution from moving off the deck periphery.

12. A magnetic tape cartridge as described in claim 1 further characterized by,
   a front wall for the cartridge by which the tape loop moves with the flange spaced from the front wall,
   a pressure roller and post at opposite ends of the front wall and guiding the loop along the front wall, said post receiving the loop from the inner convolution and the roller guiding the loop back to the outer convolution,
   and a plurality of ribs formed on the base extending upwardly therefrom forwardly of the flange and substantially equal in height to the flange for supporting the loop when it becomes slack between the pressure roller and the post.

13. A magnetic tape cartridge as described in claim 11 further characterized by,
   a front wall for the cartridge by which the tape loop moves with the flange spaced from the front wall,
   a pressure roller and post at opposite ends of the front wall and guiding the loop along the front wall, said post receiving the loop from the inner convolution and the roller guiding the loop back to the outer convolution, and a plurality of ribs formed on the base extending upwardly therefrom forwardly of the flange and substantially equal in height to the flange for supporting the loop when it becomes slack between the pressure roller and the post.

14. A magnetic cartridge as described in claim 12 further characterized by, a pressure pad disposed adjacent the front wall and carried by one of the cover and base for supporting the loop near the front wall between the post and roller, said pad having a sponge-like strip, and posts engaging the ends of the strip and pinching them toward one another to round the ends of the strip.

15. A magnetic tape cartridge as described in claim 1 further characterized by, a front wall for the cartridge by which the tape loop moves with the flange spaced from the front wall, a pressure roller and post at opposite ends of the front wall and guiding the loop along the front wall, said post receiving the loop from the inner convolution and the roller guiding the loop back to the outer convolution, a guide disposed between the reel periphery and the post and having a tape inclined supporting edge for supporting the tape at an angle to the horizontal plane assumed by the tape as it leaves the reel and to the vertical plane assumed by the tape between roller and post.

16. A magnetic tape cartridge as described in claim 15 further characterized by, said post having a tape supporting surface disposed at an angle to the vertical so as to support said tape across its width when received from the guide.

17. A magnetic tape cartridge for endless tape comprising, a cover and a base, and a reel mounted for rotation on the base for carrying the endless tape in wound condition with an exposed loop, a plurality of sleeves carried by one of the cover and base with a shoulder formed on the inside, pins carried by the other of the cover and base and extending into the sleeves when the cover and base are closed, hooks formed on the pins to engage the shoulders to releasably lock the cover and base closed, and a solid, relatively stiff cylindrical portion formed on the pins substantially equal in diameter to the inner diameter of the sleeves and being dimensioned with respect to the sleeves to fit in the sleeves before the hooks engage the shoulders when the case is being closed to accurately align the cover and base and the hooks with the shoulders.

18. A magnetic tape cartridge for endless tape as described in claim 17 further characterized by one of the sleeves being mounted on the base and comprising a spindle for the reel.

19. A magnetic tape cartridge for endless tape as described in claim 17 further characterized by a pressure roller spaced from the reel to support the exposed loop, one of said sleeves being mounted on the base and comprising a spindle for the pressure roller, and one of said sleeves serving as a post and cooperating with the roller for supporting the exposed loop.

20. A magnetic tape cartridge for endless tape comprising, a cover and a base, a reel having a flange and hub mounted for rotation on the base for carrying the endless tape in a wound condition with an exposed loop, means cooperating with the periphery of the reel flange for perventing the outer convolution of tape wound on it from moving off the flange periphery, a front wall for the cartridge by which the tape loop moves with the reel flange spaced from the front wall, a pressure roller and post at opposite ends of the front wall and guiding the loop along the front wall, said post receiving the loop from the inner convolution of tape on the reel, and the roller guiding the loop back to the outer convolution on the reel, a plurality of ribs formed on the base extending upwardly therefrom forwardly of the reel flange and substantially equal in height to the flange for supporting the loop when it becomes slack between the region of the pressure roller and post, a pressure pad exposed adjacent the front wall and carried by one of the cover and base for supporting the loop near the front wall between the post and roller, said pad having a sponge like strip, and posts engaging the ends of the strip and pinching them toward one another to round the ends of the strip.

21. A magnetic tape cartridge for endless tape comprising, a cover and a base, and a reel mounted for rotation on the base for carrying the endless tape in a wound condition with an exposed loop, a plurality of sleeves carried by one of the cover and base, pins carried by the other of the cover and base and extending into the sleeves when the cover and base are closed, latching means including hooks and shoulders formed on the pins and sleeves to engage one another and releaseably lock the cover and base closed, and relatively stiff aligning means formed on the pins conforming in cross section to the cross section of the sleeves to fit in the sleeves before the latching means engage to lock the cover and base closed to align the cover and base and the latching means.

22. A magnetic tape cartridge for endless tape as described in claim 21 further characterized by one of the sleeves being mounted on the base and comprising a spindle for the reel.

23. A magnetic tape cartridge as described in claim 22 further characterized by a pressure roller spaced from the reel to support the exposed loop, one of said sleeves being mounted on the base and comprising a spindle for the pressure roller, and one of the sleeves serving as a post and cooperating with the roller for supporting the exposed loop.

24. A magnetic tape cartridge for endless tape comprising a cover and a base defining a case with a top, bottom, rear and side walls, a reel mounted for rotation in the case for carrying endless tape in wound condition with an exposed loop, a pressure pad mounted in the case for supporting a portion of the loop, said pad comprising a foam cushion disposed adjacent the front wall of the case, said cushion being elongated in a direction parallel to the front wall, a plurality of posts in the case engaging the cushion for retaining it in place in the case, one of said posts engaging the center of the cushion and additional posts engaging the ends of the cushion, and a relatively stiff rear panel adhered to the foam cushion and disposed on the side of the posts nearer the rear wall of the case.

25. A magnetic tape cartridge for endless tape comprising a cover and a base defining a case with a top, bottom, rear and side walls, a reel mounted for rotation in the case for carrying endless tape in wound condition with an exposed loop, a pressure pad mounted in the case for supporting a portion of the loop, said pad comprising a foam cushion disposed adjacent the front wall of the case, said cushion being elongated in a direction parallel to the front wall, a plurality of posts in the case engaging the cushion for retaining it in place in the case, one of said posts engaging the center of the cushion and additional posts engaging the ends of the cushion, and a slot in the central portion of the cushion, one of said posts engaging the cushion in the slot.

26. A magnetic tape cartridge as described in claim 25 further characterized by a post engaging each end of the cushion compressing the central portion of the ends thereof to round the front side of the cushion at the ends thereof.

27. A magnetic tape cartridge as described in claim 24 further characterized by said posts being mounted on the cover.

* * * * *